S. ANDREWS.
Feed Motion for Sewing Machines.
No. 21,310. Patented Aug. 31, 1858.
Fig: 1. 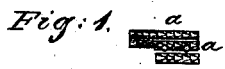
Fig: 2. 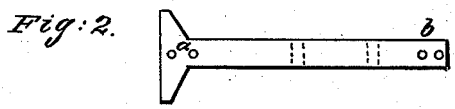
Fig: 3. 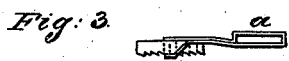
Fig: 4. 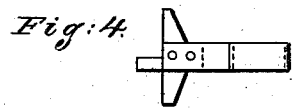
Fig: 5. 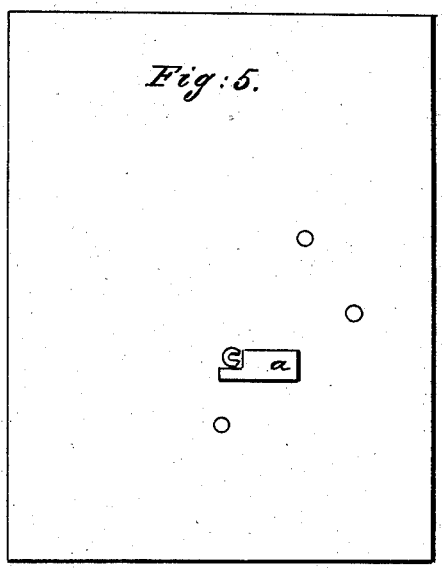
Fig: 6. 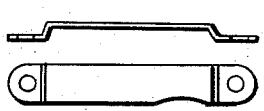
Fig: 7. 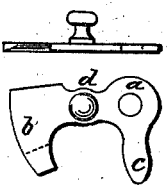
Fig: 8. 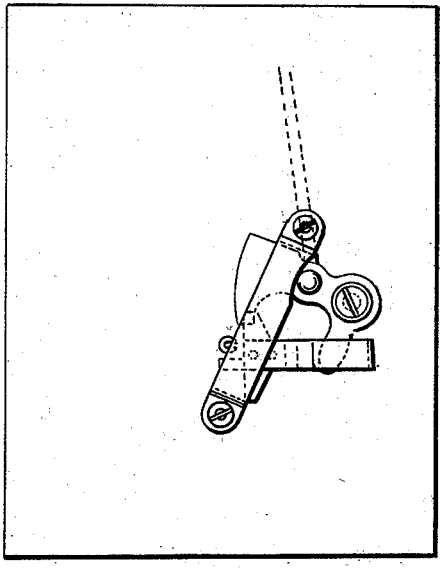
Witnesses:
Lemuel W. Serrell
Thomas G. Harold
Inventor:
Solomon Andrews.

UNITED STATES PATENT OFFICE.

SOLOMON ANDREWS, OF PERTH AMBOY, NEW JERSEY.

IMPROVEMENT IN SEWING-MACHINES.

Specification forming part of Letters Patent No. 21,810, dated August 31, 1858.

*To all whom it may concern:*

Be it known that I, SOLOMON ANDREWS, M. D., of Perth Amboy, in the county of Middlesex, in the State of New Jersey, have invented a new and Improved Feed-Motion for Sewing-Machines; and I do hereby declare that the following is a full and exact description thereof, reference being had to the accompanying drawings, and to the letters of reference marked thereon.

A small piece of metal having teeth like a saw on one flat surface, and being smooth and convex on the opposite surface, is shown at Figure 1, with two holes through it at $a$ $a$. A piece of thin sheet-steel somewhat of the form of the letter T is shown at Fig. 2, with two holes at $a$ and $b$. The long end of this piece of sheet-steel is bent over into a loop and laps on the other end, when both together are riveted on the convex side of the piece of metal, Fig. 1. A sectional view of this is shown at Fig. 3, the loop thus made being formed into a mortise, $a$. A perspective view or plan of this arrangement is shown at Fig. 4. The wings or shorter ends of this piece of sheet-steel are bent downward toward the teeth-surface of the piece of metal, Fig. 1, and so may also the tail be, so as to form a spring. This contrivance, when so completed, I denominate a "butterfly." A hole through a plate of sheet-iron of the form of the piece of metal, Fig. 1, is shown at $a$, Fig. 5. When the piece of metal, Fig. 1, is dropped into this hole, the wings and tail of the sheet-steel, Fig. 2, attached to it, as aforesaid, will prevent its falling through, and if pressed down so as to bring the sheet-steel flat with the plate it will be lifted again by the spring of the sheet-steel, bent as aforesaid, when the pressure is taken off. A piece of steel in the form of a staple, Fig. 6, is shown in section and perspective or plan. This staple is secured to the plate at both ends, extending across the wings of the butterfly, and will prevent its falling out when the plate is turned over. Another piece of steel of the form shown at Fig. 7, with a hole at $a$, is placed on a pivot on the plate, Fig. 5, at such a point as to allow its part $b$, Fig. 7, to enter between the butterfly and the staple. Its end is formed like a wedge, so as to press the butterfly-wings down upon the plate. Another part of this piece of steel $c$ is to act as a lever, being entered within the mortise in the tail of the butterfly, so as to pull it forward when it is moved in one direction and push it back again when moved in the contrary direction. A pin or stump is riveted into this piece of steel at $d$, through which a reciprocating motion is communicated to it. This piece of steel I denominate a "wedge-lever," because it combines both properties. All the parts are shown together in perspective or inverted plan on the plate at Fig. 8, with the connecting-rod to communicate the reciprocating motion broken off.

The operation is as follows, viz: When the wedge-lever is moved in its pivot toward the butterfly, the wedge $b$, Fig 7, first enters between the staple and the butterfly on the under side of the staple and over the back of the butterfly. This presses down the butterfly, because the staple will not yield. By the time the butterfly is fully pressed down, the lever $c$ comes in contact with the extreme end of the mortise in the tail of the butterfly, and will pull it in that direction as far as it is moved on. When the motion is changed to the contrary direction, the wedge is first pulled out, the butterfly rises by its spring, or, if the plate be turned over, falls by gravity or the spring, or both combined, and as soon as this is done the lever comes in contact with the other end of the mortise and pushes back the butterfly to its original position. We have thus four distinct motions of the feed produced by a reciprocating motion applied to the stump $d$ on the wedge-lever—viz., downward, forward, upward, and backward; or, if the plate be turned over, so as to be right side up, it will be upward, forward, downward, and back, in the perfect form of a square or a parallelogram, which is the motion I desire to produce for the feed of a sewing-machine. Another or a fifth motion may also be given to the piece of metal, Fig. 1, by so arranging the wedge as to operate mostly on its broad end, or by arranging the lever so as to bear gently on one side of the mortise in the butterfly-tail to support it a part of the time—viz., that of dropping the smaller end of the piece of metal, Fig. 1, first, so as to unhook the teeth from their contact with the cloth, and thus completely free them. This may be so nicely adjusted as to unhook the teeth perfectly from raw cotton or other loose fiber.

I am aware that the square or parallelogram motion has been employed for feeding the cloth in sewing-machines. Therefore I do not claim this movement; but What I do claim, and desire to secure by Letters Patent, is—

The combination of the wedge and lever piece, Fig. 7, and feeding-foot, Fig. 3, constructed and operating in the manner substantially as described, for the purpose specified.

SOLOMON ANDREWS.

Witnesses:
LEMUEL W. SERRELL,
THOMAS G. HAROLD.